(12) United States Patent
Lissianski et al.

(10) Patent No.: US 7,833,315 B2
(45) Date of Patent: Nov. 16, 2010

(54) METHOD AND SYSTEM FOR REDUCING MERCURY EMISSIONS IN FLUE GAS

(75) Inventors: Vitali Lissianski, San Juan Capo, CA (US); Peter Martin Maly, Lake Forest, CA (US); William Randall Seeker, San Clemente, CA (US); Christopher Aaron Samuelson, Anaheim, CA (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 12/037,509

(22) Filed: Feb. 26, 2008

(65) Prior Publication Data

US 2009/0211444 A1   Aug. 27, 2009

(51) Int. Cl.
*B01D 53/06* (2006.01)
*B01D 53/64* (2006.01)

(52) U.S. Cl. .................. 95/107; 110/203; 110/345
(58) Field of Classification Search .............. 95/107, 95/134; 96/150, 153; 110/203, 345; 502/437; 423/210
See application file for complete search history.

(56) References Cited

U.S. PATENT DOCUMENTS

| | | | |
|---|---|---|---|
| 4,196,173 A | 4/1980 | deJong et al. |
| 4,233,274 A | 11/1980 | Allgulin |
| 4,273,747 A | 6/1981 | Rasmussen |
| 4,602,573 A | 7/1986 | Tanca |
| 4,814,152 A | 3/1989 | Yan |
| 4,843,102 A | 6/1989 | Horton |
| 4,987,115 A | 1/1991 | Michel-Kim |
| 5,141,724 A | 8/1992 | Audeh et al. |
| 5,409,522 A | 4/1995 | Durham et al. |
| 5,413,477 A | 5/1995 | Moreland |
| 5,507,238 A | 4/1996 | Knowles |
| 5,572,938 A | 11/1996 | Leger |
| 5,695,726 A | 12/1997 | Lerner |
| 5,787,823 A | 8/1998 | Knowles |
| 6,027,551 A | 2/2000 | Hwang et al. |
| 6,206,685 B1 | 3/2001 | Zamansky et al. |
| 6,280,695 B1 | 8/2001 | Lissianski et al. |
| 6,439,138 B1 | 8/2002 | Teller et al. |
| 6,451,094 B1 | 9/2002 | Chang et al. |
| 6,471,506 B1 | 10/2002 | Zamansky et al. |
| 6,521,021 B1 * | 2/2003 | Pennline et al. ............... 95/134 |
| 6,558,454 B1 | 5/2003 | Chang et al. |
| 6,595,147 B2 | 7/2003 | Teller et al. |
| 6,604,474 B2 | 8/2003 | Zamansky et al. |
| 6,719,828 B1 | 4/2004 | Lovell et al. |

(Continued)

*Primary Examiner*—Frank M Lawrence
(74) *Attorney, Agent, or Firm*—Armstrong Teasdale LLP

(57) ABSTRACT

Method and a system for capturing mercury in a flue gas are provided. The method includes partially oxidizing a carbonaceous solid fuel in a gasifier such that a thermally activated carbon-containing solid sorbent and gaseous gasification products are generated wherein the gasifier is proximate to a combustion system for combusting a mercury containing fuel. The method further includes storing the generated thermally activated carbon-containing solid sorbent proximate to the combustion system and combusting a mercury containing fuel in a combustion zone of the combustion system wherein mercury released during combustion is entrained in flue gas generated by the combustion. The method also includes injecting the thermally activated solid sorbent in the flue gas downstream of the combustion zone and absorbing at least a portion of the entrained mercury on the thermally activated solid sorbent.

20 Claims, 3 Drawing Sheets

U.S. PATENT DOCUMENTS

| | | | |
|---|---|---|---|
| 6,818,043 B1 * | 11/2004 | Chang et al. | 95/37 |
| 6,848,374 B2 * | 2/2005 | Srinivasachar et al. | 110/345 |
| 2001/0041157 A1 | 11/2001 | Spokoyny | |
| 2002/0029690 A1 | 3/2002 | Ridgeway et al. | |
| 2002/0095866 A1 | 7/2002 | Hassett | |
| 2002/0102189 A1 | 8/2002 | Madden et al. | |
| 2002/0166484 A1 | 11/2002 | Zamansky et al. | |
| 2002/0170431 A1 | 11/2002 | Chang et al. | |
| 2003/0005634 A1 | 1/2003 | Calderon et al. | |
| 2003/0009932 A1 | 1/2003 | Kobayashi et al. | |
| 2003/0079606 A1 | 5/2003 | Katz | |
| 2003/0091490 A1 | 5/2003 | Nolan et al. | |
| 2003/0091948 A1 | 5/2003 | Bool, III et al. | |
| 2003/0099912 A1 | 5/2003 | Kobayaski et al. | |
| 2003/0099913 A1 | 5/2003 | Kobayaski et al. | |
| 2003/0104328 A1 | 6/2003 | Kobayaski et al. | |
| 2003/0104937 A1 | 6/2003 | Sinha | |
| 2003/0108470 A1 | 6/2003 | Spencer et al. | |
| 2003/0108833 A1 | 6/2003 | Kobayaski et al. | |
| 2003/0110994 A1 | 6/2003 | Lissianski et al. | |
| 2003/0143128 A1 | 7/2003 | Lanier et al. | |
| 2003/0147793 A1 | 8/2003 | Breen et al. | |
| 2003/0154858 A1 | 8/2003 | Kleut et al. | |
| 2003/0185718 A1 | 10/2003 | Sellakumar | |
| 2004/0011057 A1 | 1/2004 | Huber | |
| 2005/0274307 A1 * | 12/2005 | Lissianski et al. | 110/345 |
| 2006/0120934 A1 | 6/2006 | Lanier et al. | |
| 2007/0116616 A1 | 5/2007 | Taylor | |
| 2008/0011158 A1 | 1/2008 | Barger et al. | |

* cited by examiner

METHOD AND SYSTEM FOR REDUCING MERCURY EMISSIONS IN FLUE GAS

BACKGROUND OF THE INVENTION

This invention relates generally to the combustion of solid fuels and, more particularly, to the generation and storage of sorbent used to capture mercury (Hg) in flue gas generated during coal combustion.

Volatile metals such as mercury are among the air pollutants produced by coal combustion processes. As mercury volatizes during coal combustion, it enters the flue gas generated by the combustion. If not captured, the mercury may pass into the atmosphere with the stack gases from the combustor. At least some known methods of reducing mercury emissions include the injection of an activated carbon as a sorbent that captures mercury in the flue gas. The mercury can then be removed from the flue gas and sequestered in an environmentally acceptable manner. The efficiency of mercury removal by activated carbon injection depends on coal type and the specific configuration of the emission control system, such as injection of the sorbent upstream of a particulate collector or a compact baghouse added downstream an existing electrostatic particulate control device. However, material costs of activated carbon in some cases limit the usefulness of activated carbon mercury removal systems.

BRIEF DESCRIPTION OF THE INVENTION

In one embodiment, a method for capturing mercury in a flue gas includes partially oxidizing a carbonaceous solid fuel in a gasifier such that a thermally activated carbon-containing solid sorbent and gaseous gasification products are generated wherein the gasifier is proximate to a combustion system for combusting a mercury containing fuel. The method further includes storing the generated thermally activated carbon-containing solid sorbent proximate to the combustion system and combusting a mercury containing fuel in a combustion zone of the combustion system wherein mercury released during combustion is entrained in flue gas generated by the combustion. The method also includes injecting the thermally activated solid sorbent in the flue gas downstream of the combustion zone and absorbing at least a portion of the entrained mercury on the thermally activated solid sorbent.

In another embodiment, a system for capturing mercury from a stream of flue gas includes a waste treatment system coupled in flow communication with a source of flue gas that includes mercury wherein the waste treatment system is configured to receive the stream of flue gas from the source of flue gas and wherein the waste treatment system includes a solid sorbent injector and a solid sorbent collection device. The system also includes a solid sorbent generator coupled in flow communication with said waste treatment system, and a solid sorbent storage vessel configured to receive a flow of solid sorbent from said solid sorbent generator and configured to supply a flow of stored sorbent material to said waste treatment system.

In yet another embodiment, a method for capturing mercury in a flue gas formed by solid fuel combustion includes combusting a solid coal fuel in a combustion zone such that mercury released from the fuel during combustion is entrained in a flow of flue gas generated by the combustion. The method also includes generating a thermally activated carbon-containing solid sorbent and gaseous gasification products by partially gasifying a carbon solid fuel in a gasifier proximate the combustion zone and storing the solid sorbent generated in the gasifier in a sorbent storage vessel proximate the flow of flue gas. The method further includes injecting the thermally activated solid sorbent from the storage vessel into the flue gas downstream of the combustion zone and capturing at least some of the entrained mercury with the injected solid sorbent. Optionally, the thermally activated solid sorbent can be further activated by adding halogens, for example, but not limited to bromine prior to the storage in the storage vessel.

DETAILED DESCRIPTION OF THE INVENTION

The following detailed description illustrates embodiments of the invention by way of example and not by way of limitation. It is contemplated that the invention has general application to reducing emissions from combustion systems such as boilers, furnaces, and kilns.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
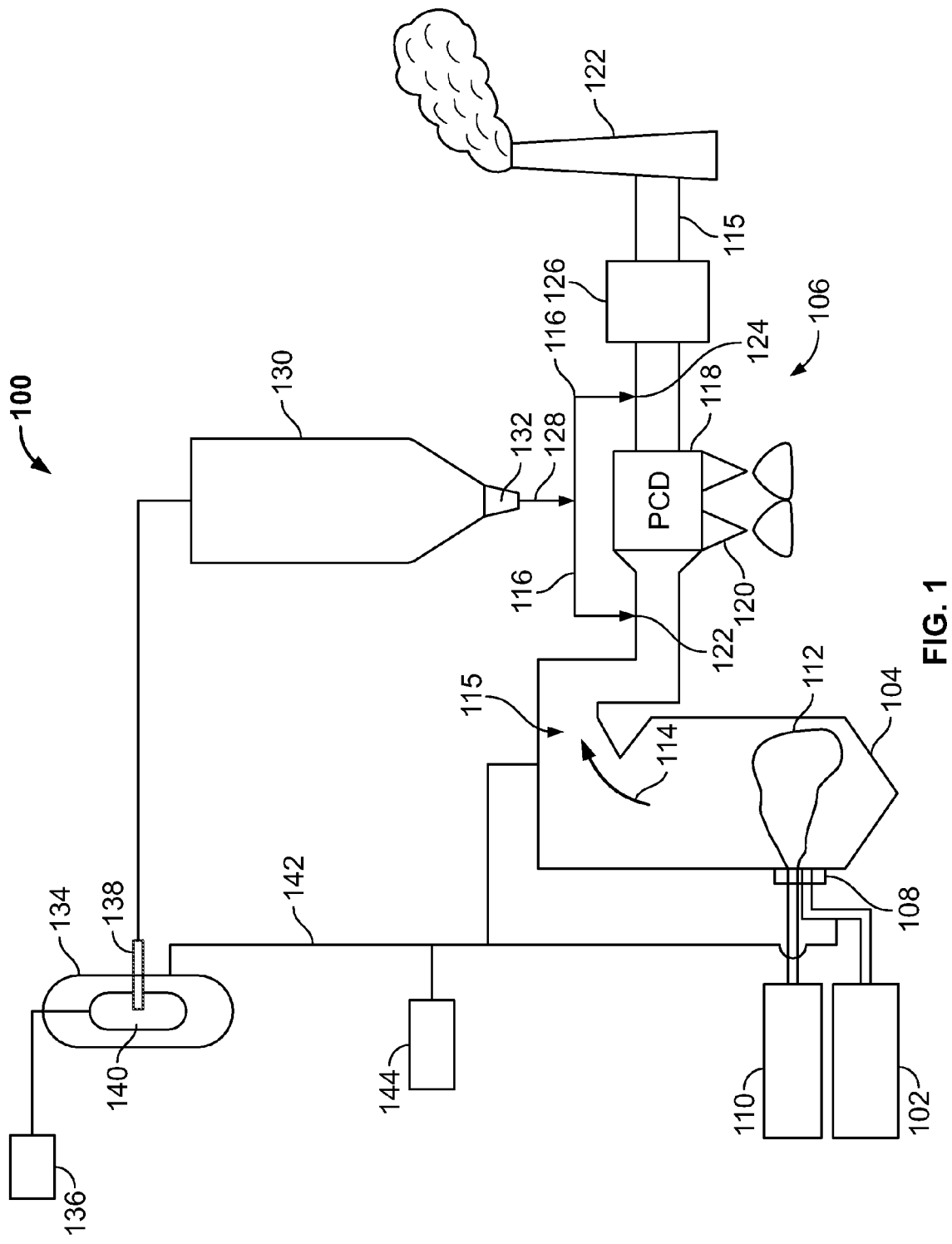
FIG. 1 is a schematic view of a coal-fired power plant in accordance with an exemplary embodiment of the present invention.

FIG. 1 is a schematic view of a coal-fired power plant 100 in accordance with an exemplary embodiment of the present invention. In the exemplary embodiment, power plant 100 includes a supply of coal 102, a boiler 104, and a combustion waste treatment system 106. Boiler 104 includes a plurality of burners 108 generally spaced about the walls of boiler 104 (wall-fired) or spaced about the corners of boiler 104 (corner-fired). Burners 108 are supplied with a fluidized solid fuel such as pulverized coal and/or a gaseous fuel. Burners 108 are also supplied with air from an air source 110 that facilitates transporting coal 102 to boiler 104 and facilitates combustion of coal 102. Burners 108 mix coal 102 and air to form a combustible mixture that is injected into an interior of boiler 104. The coal and air mixture burn in a combustion zone 112 within boiler 104. Flue gases 114 generated in combustion zone 112 may contain mercury released from coal 102 during the combustion process.

Flue gas 114 flows through boiler 104 and into an exhaust duct 115 releasing its heat to a plurality of heat exchange tubes and platens (not shown) suspended in duct 115. Duct 115 channels flue gas 114 to waste treatment system 106. In the exemplary embodiment, waste treatment system 106 includes a sorbent injection system 116, a particulate control device (PCD) 118, such as an electrostatic precipitator (ESP) including a plurality of ash discharge hoppers 120 for the removal of collected ash for further processing, and a stack 122 for flue gas discharge. Sorbent injection system 116 may inject sorbent into duct 115 upstream 122 of PCD 118. In addition (or alternatively) the sorbent may be injected downstream 124 of PCD 118 if a dedicated sorbent particulate collection device 126 is included in waste treatment system 106.

A sorbent discharge chute 128 is configured to convey the sorbent from a sorbent storage vessel 130 to sorbent injection system 116. Sorbent exiting sorbent storage vessel 130 may be assisted using for example, a live wall hopper 132. Sorbent storage vessel 130 is configured to receive thermally activated carbon-containing sorbent generated by partially gasifying a fuel in a gasifier located proximate sorbent storage vessel 130. In the exemplary embodiment, a gasifier 134 is configured to partially gasify a fuel 136. A sorbent extractor 138 for example, but not limited to a lance is configured to extract the thermally activated sorbent, which is a semi-combusted coal or other carbon containing solid fuel from a combustion zone 140 of gasifier 134. Storing the sorbent material facilitates an ability to provide close control over sorbent feed rate based on stack emissions. Additionally, storing the sorbent material permits operating power plant 100 at times when gasifier 134 is not in service and also permits operating gasifier 134 to generate sorbent material when power plant 100 is not in service. Such flexibility in the dispatch of interrelated process plants facilitates increasing the availability and/or capability of, for example, a power facility that comprises more than one type of power and/or process plant that operate synergistically to generate power, power products, by-products, and waste. The gaseous products from gasifier 134 are channeled through a conduit 142 to burners 108, to an on-site load 144 such as a gas turbine engine or combined cycle plant, or may be used as a reburning fuel to reduce emissions of nitrogen oxides in on-site boiler 104 or duct 115.

Figure 2:
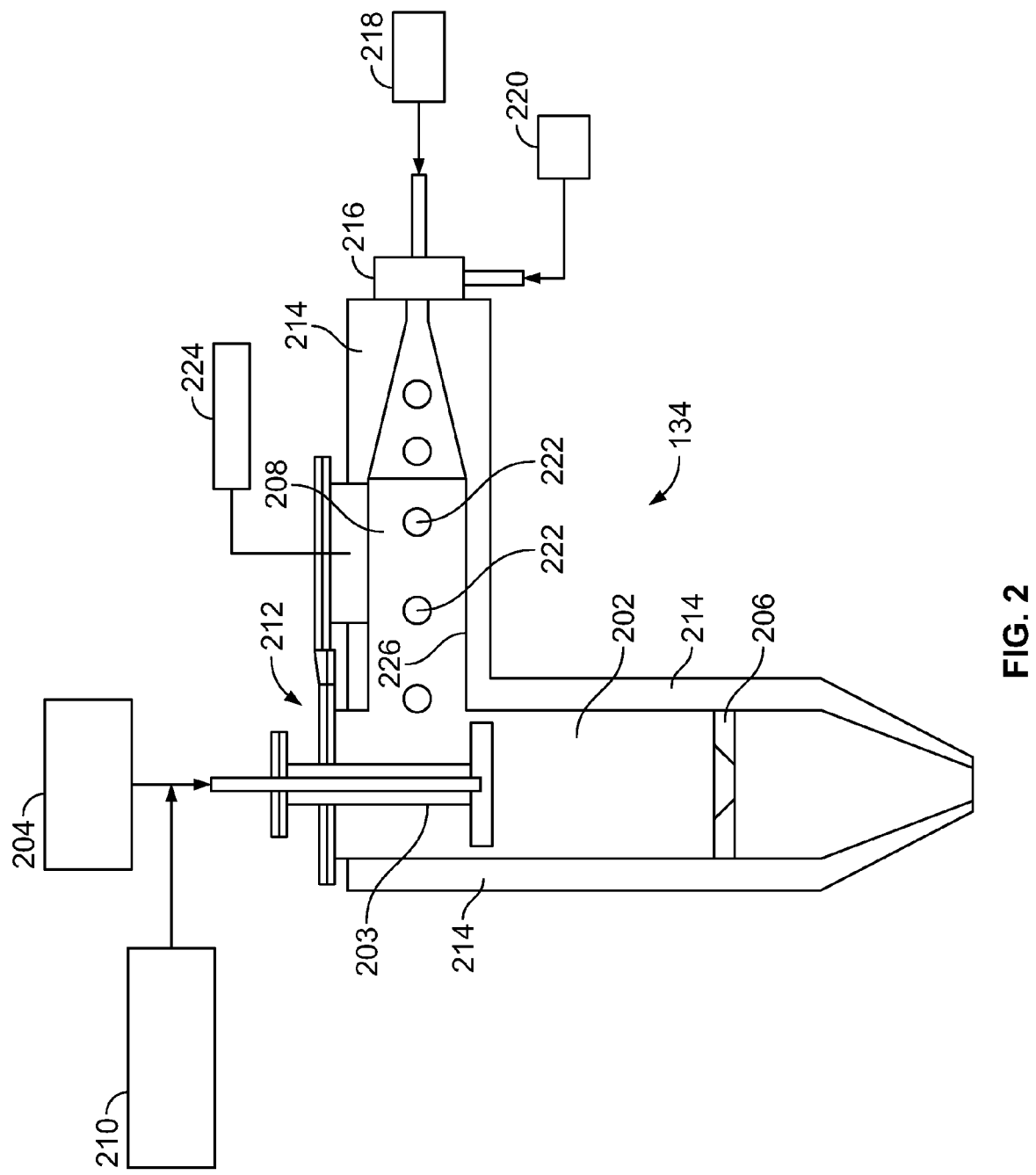
FIG. 2 is an elevation view in cross-section of a solid fuel gasifier that may be used with the system shown in FIG. 1.

FIG. 2 is an elevation view in cross-section of a solid fuel gasifier 134 that may be used with plant 100 (shown in FIG. 1). Gasifier 134 includes a vertical gasification chamber 202 into which particles of a solid fuel 204 and heat are injected. The combustion of solid fuel 204 in gasification chamber 202 produces sorbent and gasified fuel. Solid fuel 204 for sorbent combustion may be coal, biomass, sewage sludge, waste product, or other carbon containing solid fuels. A choke 206 arranged in gasification chamber 202 regulates the residence time of fuel 204 within gasification chamber 202. In the exemplary embodiment, a residence time of 0.5 to 10 seconds in gasifier chamber 202 is used for generating sorbent.

In one example, gasifier 134 may be formed from stainless steel and its inner walls are refractory lined. Heat required for solid fuel gasification is supplied by for example, but not limited to natural gas and/or the partial oxidation of a solid carbonaceous fuel and an oxidizer such as air and/or oxygen. A horizontally aligned heating chamber 208 is coupled in flow communication to gasification chamber 202. Solid fuel 204 is injected into gasification chamber 202. A supply of nitrogen or air may be used as a transport media 210 for solid fuel 204.

Solid fuel 204 is injected at an upper end 212 of gasification chamber 202 through a water-jacketed solid fuel injector 203 using transport media 210 to carry the particles of solid fuel 204 into gasification chamber 202. The heat added to gasification chamber 202 causes the particles of solid fuel 204 to partially gasify, for example, by partial oxidation, and to generate reactive sorbent particles. The walls of gasification chamber 202 and auxiliary heat chamber 208 are refractory lined 214 to resist the heat generated within gasification chamber 202.

Heat required for partial gasification of solid fuel 204 is provided by an auxiliary heat source 216 such as a burner and/or by partially combusting solid fuel 204 in gasification chamber 202. For example, a supply of natural gas 218 and air 220 are mixed in heat chamber 208 to generate heat that is provided to gasification chamber 202. Cooling ports 222 in heat chamber 208 channel a flow of cooling water 224 to cool a sidewall 226 of heat chamber 208 and solid fuel injector 203. The cooling of heat chamber 208 permits the temperature to be controlled to avoid excessive combustion of solid fuel 204 in gasification chamber 202. In various embodiments, the temperature in gasification chamber 202 is maintained in a range of approximately 1000 degrees to approximately 2000 degrees Fahrenheit.

Conditions in gasification chamber 202 are optimized to enhance the generation thermally activated sorbent having relatively high reactivity. For example, the sorbent may be produced to have a relatively large surface area and high carbon content. Process parameters in gasifier 134 include fuel residence time in gasification chamber 202, a stoichiometric ratio (SR) of carbon containing material to air, and a temperature in gasification chamber 202. By controlling these process parameters, the generation of reactive sorbent can be enhanced. Optimum process conditions in gasifier 134 are also affected by a type of solid fuel 204 and its reactivity.

Figure 3:
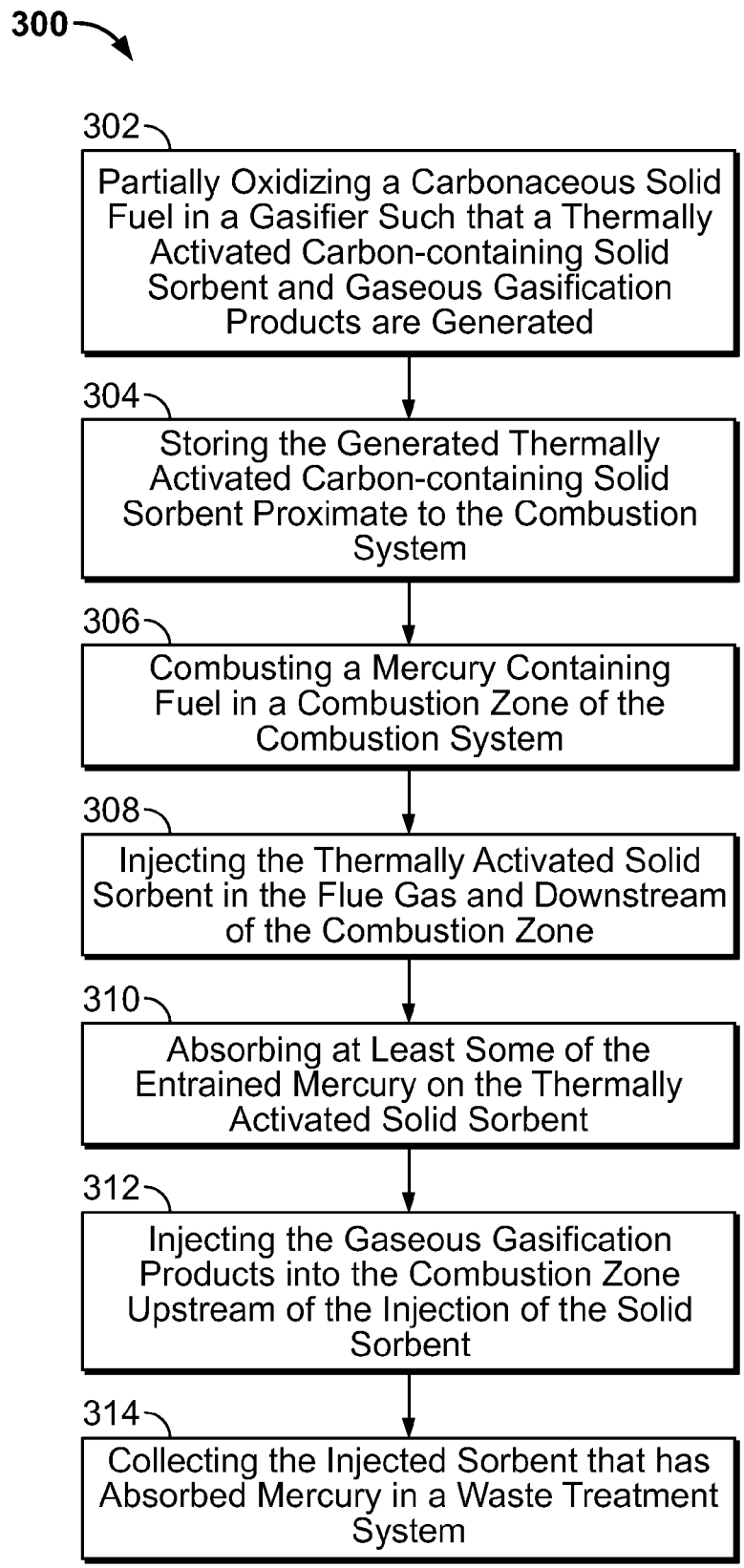
FIG. 3 is a flow chart of an exemplary method of reducing mercury emissions from flue gas.

FIG. 3 is a flow chart of an exemplary method 300 of reducing mercury emissions from flue gas. In the exemplary embodiment, method 300 includes partially oxidizing 302 a carbonaceous solid fuel in a gasifier such that a thermally activated carbon-containing solid sorbent and gaseous gasification products are generated wherein gasifier 134 is positioned proximate to a combustion system, for example, a furnace, boiler, or kiln for combusting a mercury containing fuel such as for example, but not limited to a fossil fueled boiler. Method 300 also includes storing 304 the generated thermally activated carbon-containing solid sorbent proximate to the combustion system in a bin, silo, or similar container, and combusting 306 a mercury containing fuel in a combustion zone of the combustion system wherein mercury released during combustion is entrained in flue gas generated by the combustion. Recent test work has shown that the sorbent material remains reactive after being stored. Storing 304 the sorbent material facilitates closely controlling sorbent feed rate based on stack emissions. Method 300 further includes injecting 308 the stored thermally activated solid sorbent in the flue gas. The sorbent material may be stored in a bin, silo, or similar container prior to injection for various periods of time based on a generation rate of the sorbent material and a rate of usage of the sorbent material in the combustion system. Testing has indicated that the thermally activated sorbent remains reactive after being stored for a period of weeks or months. In one embodiment, the sorbent material is injected downstream of the combustion zone. Method 300 also includes absorbing 310 at least some of the entrained mercury on the thermally activated solid sorbent. Along with the solid carbon containing sorbent, the gasification process generates a synthesis gas stream. In alternative embodiments, method 300 includes injecting 312 at least some of the generated synthesis gas into the combustion system as a reburning fuel to reduce emissions of nitrogen oxides. In some embodiments the gaseous gasification products may be injected 312 into duct 115 upstream of the injection of the solid sorbent. Embodiments of method 300 further include collecting 314 the injected sorbent that has absorbed mercury in a waste treatment system.

The above-described embodiments of a method and system of reducing mercury emissions from a combustion system provides a cost-effective and reliable means generating a thermally activated sorbent material that can absorb mercury and remove it from the flue gas stream, storing the sorbent material for use in the combustion system at a later time, and using synthesis gas a reburn fuel to facilitate reducing $NO_x$ emissions from the combustion system. More specifically, the methods and systems described herein facilitate generating the sorbent material on-site in proximity to the combustion system. In addition, the above-described methods and systems facilitate matching a supply of sorbent material to a demand for the sorbent material in the combustion system and storing the sorbent material for periods of weeks or months to permit operating the power plant at times when the gasifier is not in service and also permits operating the gasifier to generate sorbent material when the power plant is not in service. Such flexibility in the dispatch of interrelated process plants facilitates increasing the availability and/or capability of, for example, a power facility that comprises more than one type of power and/or process plant that operate synergistically to generate power, power products, by-products, and waste. As a result, the methods and systems described herein facilitate reducing emissions from a combustion system in a cost-effective and reliable manner.

While the disclosure has been described in terms of various specific embodiments, it will be recognized that the disclosure can be practiced with modification within the spirit and scope of the claims.

What is claimed is:

1. A method for capturing mercury in a flue gas of a combustion system, said method comprising:
    combusting a mercury containing fuel in a combustion zone of the combustion system, wherein mercury released during combustion is entrained in flue gas generated by the combustion;
    partially oxidizing a carbonaceous solid fuel in a gasifier local to the combustion system such that a thermally activated carbon-containing solid sorbent and gaseous gasification products are generated, the gasifier comprising a choke arranged in a gasification chamber that regulates a residence time of the solid fuel within the gasification chamber, the gasifier being proximate to a combustion system for combusting a mercury containing fuel;
    storing the generated thermally activated carbon-containing solid sorbent proximate to the combustion system;
    injecting the thermally activated solid sorbent in the flue gas and downstream of the combustion zone;
    injecting at least a portion of the gaseous gasification products into at least one of the combustion system downstream of the combustion zone and a flue duct downstream of the combustion zone as a reburn fuel to facilitate reducing $NO_x$ emissions from the combustion system; and
    absorbing at least a portion of the mercury in the flue gas with the thermally activated solid sorbent.

2. A method in accordance with claim 1 further comprising injecting the gaseous gasification products into the combustion zone upstream of the injection of the solid sorbent.

3. A method in accordance with claim 1 further comprising channeling the solid sorbent generated in the gasifier to a storage vessel.

4. A method in accordance with claim 3 further comprising channeling the stored solid sorbent generated in the gasifier from the storage vessel through a conduit to the flue gas.

5. A method in accordance with claim 1 wherein partially oxidizing a carbonaceous solid fuel in a gasifier such that a thermally activated carbon-containing solid sorbent and gaseous gasification products are generated comprises partially oxidizing at least one of coal, biomass, sewage sludge and a carbon containing waste product.

6. A method in accordance with claim 1 wherein injecting the thermally activated solid sorbent in the flue gas comprises injecting the thermally activated solid sorbent in the flue gas upstream of a particulate control device, wherein said method further comprises collecting the solid sorbent with the absorbed mercury in the particulate control device.

7. A method in accordance with claim 1 wherein injecting the thermally activated solid sorbent in the flue gas comprises injecting the thermally activated solid sorbent in the flue gas downstream of a particulate control device, wherein said method further comprises collecting the solid sorbent with the absorbed mercury in a sorbent collection device.

8. A method in accordance with claim 1 further comprising adding a halogen material comprising bromine to the solid sorbent.

9. A system for capturing mercury from a stream of flue gas, said system comprising:
    a waste treatment system coupled in flow communication with a source of flue gas wherein the flue gas includes mercury, said waste treatment system is configured to receive the stream of flue gas from the source of flue gas, said waste treatment system comprising a solid sorbent injector and a solid sorbent collection device;
    a solid sorbent generator coupled in flow communication with said waste treatment system said solid sorbent generator comprising a choke arranged in a gasification chamber that regulates a residence time of the solid fuel within the gasification chamber, said solid sorbent generator coupled in flow communication with the stream of flue gas through a conduit configured to inject at least a portion of a flow of gaseous gasification products generated in said solid sorbent generator into at least one of the waste treatment system downstream of the source of flue gas and a flue duct downstream of the source of flue gas as a reburn fuel to facilitate reducing $NO_x$ emissions from the combustion system; and
    a solid sorbent storage vessel configured to receive a flow of solid sorbent from said solid sorbent generator and configured to supply a flow of stored sorbent material to said waste treatment system.

10. A system in accordance with claim 9 wherein said solid sorbent generator comprises a gasifier having an inlet for a solid carbon fuel and a gasification chamber within which the solid carbon fuel is at least partially oxidized such that solid sorbent and gasified gas products are generated.

11. A system in accordance with claim 10 wherein said gasification chamber is separate from the source of flue gas and wherein the gasifier receives the solid carbon fuel, combusts the solid carbon fuel and generates the solid sorbent in the gasifier.

12. A system in accordance with claim 9 further comprising a conduit extending between said solid sorbent generator and said solid sorbent storage vessel, said conduit configured to convey the solid sorbent to said solid sorbent storage vessel.

13. A system in accordance with claim 9 wherein said solid sorbent generator is configured to generate solid sorbent and gasified gas products, said system further comprising a solids separator configured to separate solid sorbent from the gasified gas products.

14. A system in accordance with claim 9 further comprising adding a halogen material to the solid sorbent such that the solid sorbent is additionally activated using the halogen material.

15. A system in accordance with claim 14 wherein adding a halogen material to the solid sorbent comprises adding a halogen material comprising bromine to the solid sorbent.

16. A method for capturing mercury in a flue gas formed by solid fuel combustion comprising:
    combusting a solid coal fuel in a combustion zone such that mercury released from the fuel during combustion is entrained in a flow of flue gas generated by the combustion;

generating a thermally activated carbon-containing solid sorbent and gaseous gasification products by partially gasifying a carbon solid fuel in a gasifier proximate the combustion zone;

injecting at least a portion of the gaseous gasification products into the flow of flue gas downstream of the combustion zone as a reburn fuel to facilitate reducing $NO_x$ emissions from the combustion system;

storing the solid sorbent generated in the gasifier in a sorbent storage vessel proximate the flow of flue gas the gasifier comprising a choke arranged in a gasification chamber that regulates a residence time of the solid fuel within the gasification chamber;

adding a halogen material to the solid sorbent such that the solid sorbent is additionally activated using the halogen material;

injecting the thermally activated solid sorbent from the storage vessel into the flue gas downstream of the combustion zone, and capturing at least some of the mercury in the flow of flue gas with the injected solid sorbent.

17. A method in accordance with claim 16 wherein generating a thermally activated carbon-containing solid sorbent and gaseous gasification products comprises generating a thermally activated carbon-containing solid sorbent and gaseous gasification products in a gasifier that is separate from the combustion zone.

18. A method in accordance with claim 16 further comprising separating the solid sorbent from the gaseous gasification products generated by the gasifier before the solid sorbent flows into the flue gas.

19. A method in accordance with claim 16 further comprising injecting the gaseous gasification product into the combustion zone.

20. A method in accordance with claim 16 wherein adding a halogen material to the solid sorbent comprises adding a halogen material comprising bromine to the solid sorbent.

* * * * *